United States Patent [19]
Kelly

[11] Patent Number: 5,673,146
[45] Date of Patent: Sep. 30, 1997

[54] BINOCULAR IMAGING SYSTEM

[76] Inventor: Shawn L. Kelly, 8479 Pine Cove Dr., Commerce Township, Mich. 48382

[21] Appl. No.: 287,967

[22] Filed: Aug. 9, 1994

[51] Int. Cl.[6] .................... G02B 27/22; G02B 21/22; G02B 23/00
[52] U.S. Cl. .................... 359/462; 359/376; 359/377; 359/407; 359/434; 359/480
[58] Field of Search .................... 359/9, 14, 376, 359/462, 463, 464, 465, 466, 480, 482, 496, 583, 630, 637, 638, 639, 640, 407, 434, 619, 377

[56] References Cited

U.S. PATENT DOCUMENTS

| | | | |
|---|---|---|---|
| 4,245,882 | 1/1981 | Chang | 359/24 |
| 4,575,722 | 3/1986 | Anderson | 340/783 |
| 4,717,239 | 1/1988 | Stenblik | 359/480 |
| 4,761,066 | 8/1988 | Conter | 359/376 |
| 4,968,117 | 11/1990 | Chern et al. | 350/162.24 |
| 5,035,474 | 7/1991 | Moss et al. | 350/3.7 |
| 5,093,567 | 3/1992 | Staveley | 250/221 |
| 5,124,821 | 6/1992 | Antier et al. | 359/14 |
| 5,134,521 | 7/1992 | Lacroix et al. | 359/631 |
| 5,198,928 | 3/1993 | Chauvin et al. | 359/465 |
| 5,227,898 | 7/1993 | Iavecchia et al. | 359/9 |
| 5,282,085 | 1/1994 | Volkert et al. | 359/377 |
| 5,321,447 | 6/1994 | Sander et al. | 359/376 |
| 5,355,253 | 10/1994 | Nanjo et al. | 359/473 |

*Primary Examiner*—Paul M. Dzierzynski
*Assistant Examiner*—Audrey Chang

[57] ABSTRACT

A wide FOV binocular imaging system utilizes an imaging structure (14) to produce an intermediate image (16), and a field lens (18) and beam splitting surface (20) located proximate the intermediate image to concentrate, split, and direct the light from the intermediate image into an eye lens (22) at two viewing zones exit pupils (22(a), 22(b)). The present invention produces a wide FOV and comfortable exit pupil while employing a single entrance pupil.

17 Claims, 2 Drawing Sheets

BINOCULAR IMAGING SYSTEM

BACKGROUND OF THE INVENTION

The present invention relates generally to binocular imaging systems for stereo viewing of an object, and more particularly to an inexpensive, wide field-of-view binocular imaging system employing a single entrance pupil.

Generally, binocular imaging systems having a single entrance pupil, such as used in binocular microscopes and in some forms of head mounted display systems, produce binocular virtual images by employing a beam splitting cube prism and a plurality of fold mirrors positioned after the objective or relay lens to produce twin intermediate images, which are then each magnified by a similar eyepiece. The beam splitters in such systems suffer from the drawback that they are generally formed from one or more glass cubes which are expensive and which add considerable weight to the system. Further, the system space required by such beam splitters and fold mirrors restricts the magnification and aperture of the objective lens in forming the intermediate image, placing a greater burden on the eyepieces, and a subsequent increase in their complexity and cost, to produce a wide field of view with a comfortable exit pupil.

SUMMARY OF THE INVENTION

It is therefore an object of the invention to provide an improved binocular imaging system design which employs a single entrance pupil.

It is another object of the invention to provide a binocular imaging system which employs a single entrance pupil and which produces a wide field of view and a comfortable exit pupil with fewer, simpler and/or less expensive imaging components.

It is another object of the present invention to provide a binocular imaging system which substantially cancels or reduces image aberrations while utilizing a single entrance pupil and producing a wide field of view with a comfortable exit pupil.

It is yet another object of the present invention to provide a binocular imaging system suitable for use in a head mounted display and having a reduced number, size, and complexity of optical components for improving the display's weight distribution to maximize a user's comfort.

In accordance with the present invention, a binocular imaging system comprises a means for forming an intermediate image of an object, a field lens or mirror comprising a beam splitting surface located proximate the intermediate image, and an eye lens to form binocular virtual images of the intermediate image. The object may further comprise interlaced, color, polarization or similarly encoded stereo images which may be separated by appropriate filtering in the eye lens to produce stereo binocular virtual images. Spatial filtering may also be employed proximate the eye lens to remove artificial image structures produced by the beam splitting surface.

The present invention further significantly cancels or reduces image aberrations produced by the intermediate image forming means. More specifically, the field lens may further comprise a convergent reflective surface positioned proximate the intermediate image and the beam splitting surface for providing an aberration reversing means for reversing at least some of the aberrations in the intermediate image. Thus, the re-imaging of the intermediate image by the eye lens will significantly cancel the reversed aberrations.

Therefore, the present invention eliminates the use of cube beam splitters, multiple fold mirrors, and expensive eyepieces by creating a large intermediate image which may be viewed through a simple magnifier/eye lens. The beam splitting means operates to split and direct the light from the intermediate image into the magnifier to form the desired locations of the two exit pupils. The field lens serves to concentrate this light into the exit pupils for maximum image brightness.

The present invention will be more fully understood upon reading the following detailed description of the several embodiments in conjunction with the accompanying drawings.

DETAILED DESCRIPTION OF THE PREFERRED EMBODIMENT(S)

Figure 1:
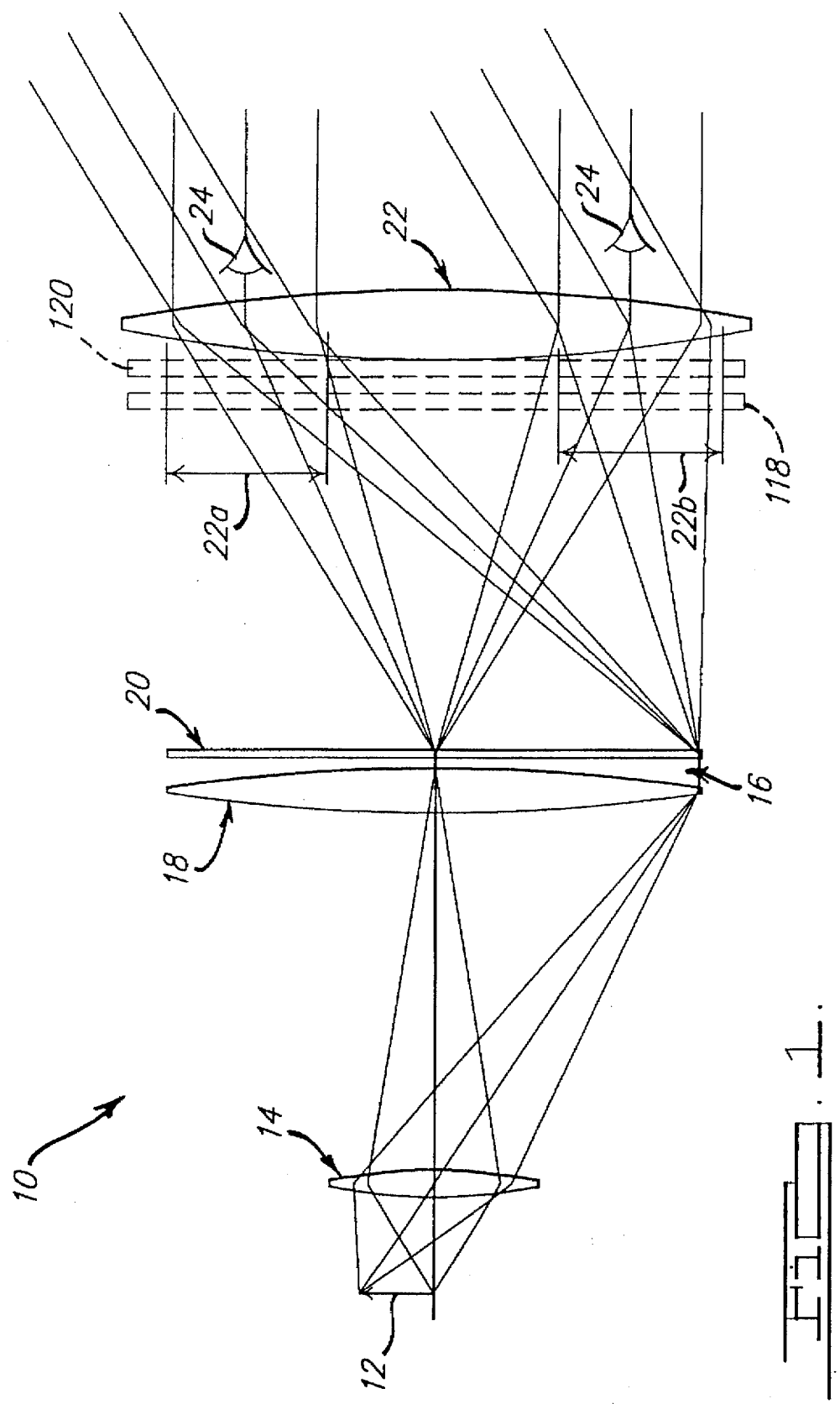
FIG. 1 is a schematic illustration of a wide FOV binocular imaging system in accordance with a first embodiment of the present invention.

A binocular imaging system 10 in accordance with the present invention is shown in FIG. 1 wherein an object 12 is imaged by an objective lens 14 to form an intermediate image 16 proximate a positive field lens 18 and a beam splitting surface 20. The light forming the intermediate image 16 is split by the beam splitter surface 20 and converged by the field lens 18 to enter two similar viewing zones or areas 22(a) and 22(b) of an eye lens 22. The eye lens is focused on the intermediate image to form binocular virtual images of the object 12 as viewed by a user's eyes 24. The image produced by system 10 of the present invention is an inverted virtual image, which one having ordinary skill in the art will readily appreciate may be reoriented by any suitable image inverting structure.

The object 12 represents a finite dimensional or angular source of radiation and includes but is not limited to distant as well as near scenes, electronic display devices such as liquid crystal panels, film images or the relayed image of yet a different object.

The objective lens 14 comprises a simple or compound optical system employed to operate on the object 12 to form an intermediate image 16 including such systems optimized either independent of or in conjunction with the remaining elements of system 10.

The field lens 18 comprises a means for concentrating the light from the intermediate image. Such means includes, but is not limited to, standard, Fresnel, diffractive, holographic or reflective optical elements or a combination thereof.

The eye lens 22 comprises either a monolithic standard lens, Fresnel lens or equivalent means to form a virtual image of the intermediate image 16. The eye lens may alternatively comprise a single lens or lens system for each eye and may further comprise off-axis as well as tilted characteristics to insure a proper overlap of the left and right eye virtual images. The eye lens(es) can be mounted to an adjustable support structure (not shown) to allow for movement along the optical axis to provide for focus adjustments.

The beam splitter surface 20 comprises a means for applying an angular deviation to a portion of the light passing through the beam splitter surface while applying a similar but negative angular deviation to the remaining portion. Such means includes, but is not limited to, striped prism, diffractive, and holographic beam splitters operating in either transmissive or reflective modes.

Figure 2:
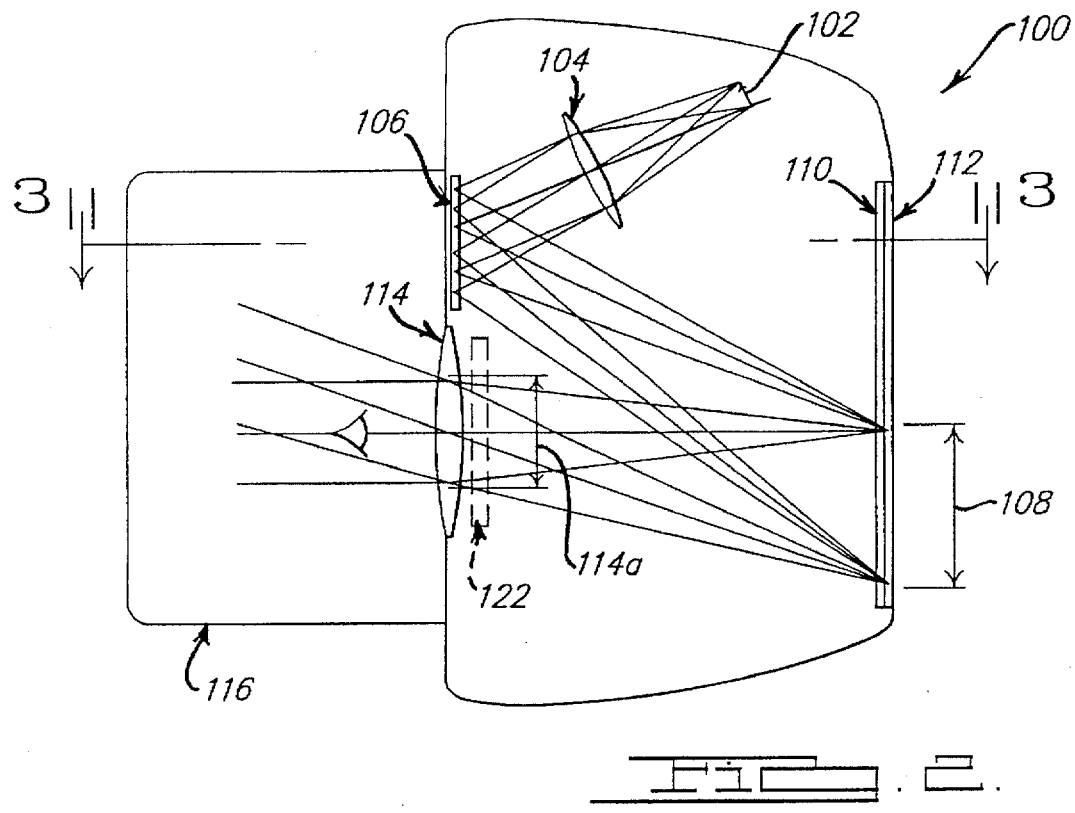
FIG. 2 is a schematic illustration of a wide FOV binocular imaging system in accordance with a second embodiment of the present invention suitable for use in a head mounted display.

A second embodiment of the present invention, as shown in FIGS. 2 (side view) and 3 (top view), illustrates a wide field of view compact binocular imaging system 100 having a single entrance pupil and a large exit pupil suitable for use in an head mounted display. An object 102 is imaged by an objective lens 104 as reflected off of a fold mirror 106 to form an intermediate image 108 proximate a combination positive Fresnel lens 110 and a reflective striped prism beam splitting surface 112. The light forming the intermediate image 108 is partially converged by the Fresnel lens 110, split by the beam splitting surface 112 and again converged by the Fresnel lens 110 to enter two similar areas 114(a) and 114(b) of an eye lens 114. The eye lens is focused on the intermediate image to form binocular virtual images of the object 102.

The fold mirror 106 is placed at or near the center of the two eye lens areas 114(a) and 114(b) and angled to position the objective lens 104 as well as the object 102 (if it is a near object) to avoid interference in the various light paths. The Fresnel lens 110 and beam splitter 112 are formed on a common substrate such that the light passes through the Fresnel lens once prior to and once again after striking the reflective beam splitter. This field lens and striped beam splitter combination is of particular benefit because both structures can be compression molded into an inexpensive single structure which can then be reflection coated on the beam splitter side. However, even if this combined element is replaced with a standard field lens and another form of beam splitting surface, the imaging system 100 of the present invention still provides a compact system which is particularly advantageous for head mounted displays because most of the system 100 components and their weight are located and/or mounted within the headgear structure 116 near the user's head. Such weight distribution is important in minimizing neck fatigue and encumbrance of the user.

Further, the Fresnel lens 110 in combination with reflective beam splitter 112 provides the benefit of at least partially reversing particular image aberrations, such as distortion and lateral chromatic aberrations, in the light rays incoming from the objective lens 104. Therefore, the imaging system 100 of the present invention accommodates the use of relatively simple positive lenses for both the objective and eye lens because the partial reversal of image aberrations by positioning the convergent Fresnel lens proximate the intermediate image allows the eye lens to at least partially cancel or reduce the particular positive lens aberrations of the objective lens 104. In effect, the convergent Fresnel lens reverses the sign of such aberrations as created by the positive objective lens so that the now negative aberrations propagating from the Fresnel lens are cancelled or significantly reduced by the positive aberrations applied by the eye lens. Such principal is more fully described in my copending patent application, Ser. No. 08/284,845, filed on Aug. 2, 1994, entitled "Wide Field of View Imaging System", and incorporated herein by reference.

It should be noted that many forms of beam splitters, such as the striped prism structure, as well as a Fresnel field lens, may create an artificial image structure in the virtual image because the optical components are located near the intermediate image. A particular benefit of the present invention is that since such imaging components are located proximate the intermediate image, they may be made very small with little concern about the diffraction effects which prohibit such small components in other locations in the imaging system. The appearance of artificial image structures in the virtual images may further be diminished by forming the intermediate image far enough from the Fresnel or beam splitting structure as to make such artificial image structure out of focus.

Finally, if the system configuration results in any residual unwanted artificial image structures, the eye lens may be fitted with an appropriate spatial filter (represented in FIG. 1 as an optional filter element 118) to remove this structure. Such spatial filtering structure includes, but is not limited to, various forms of blur filters, conventional spatial filters, image duplication and displacement optics, and other forms of optical devices whose function can be interpreted to expand the point spread function of the optical system of the present invention. However, if the alignment of the system employing a striped prism is such that the two virtual images exactly overlap, then the vertical striped gaps in the left eye virtual image will exactly be filled by the vertical image stripes in the right eye virtual image, and vice versa. Thus as the viewer's brain fuses the two images, the vertical structure produced by a striped prism beam splitter may disappear.

The present invention provides benefits which can be advantageously employed in visual imaging system applications including, but not limited to low power microscopes, binoculars, magnifiers, and low power telescopes. Of particular benefit is a system for viewing stereo images. More specifically, if the intermediate image forms directly on a striped beam splitter as described above, then both the left and right virtual images will be totally independent of each other. The left eye image will contain striped segments of the intermediate image alternating with dark stripes. The right eye image will contain the stripes of the intermediate image not directed to the left eye. Thus if the object to be viewed is formed from a stripe interlaced stereo pair of images, the beam splitter will decode the intermediate image formed from this object to yield stereo images which will overlap in the field of view of the system. Such interlaced images can comprise either separate component images of various scenes to be overlapped for the user, or they can be produced as three dimensional stereo images to produce a volumetric virtual image space.

Figure 3:
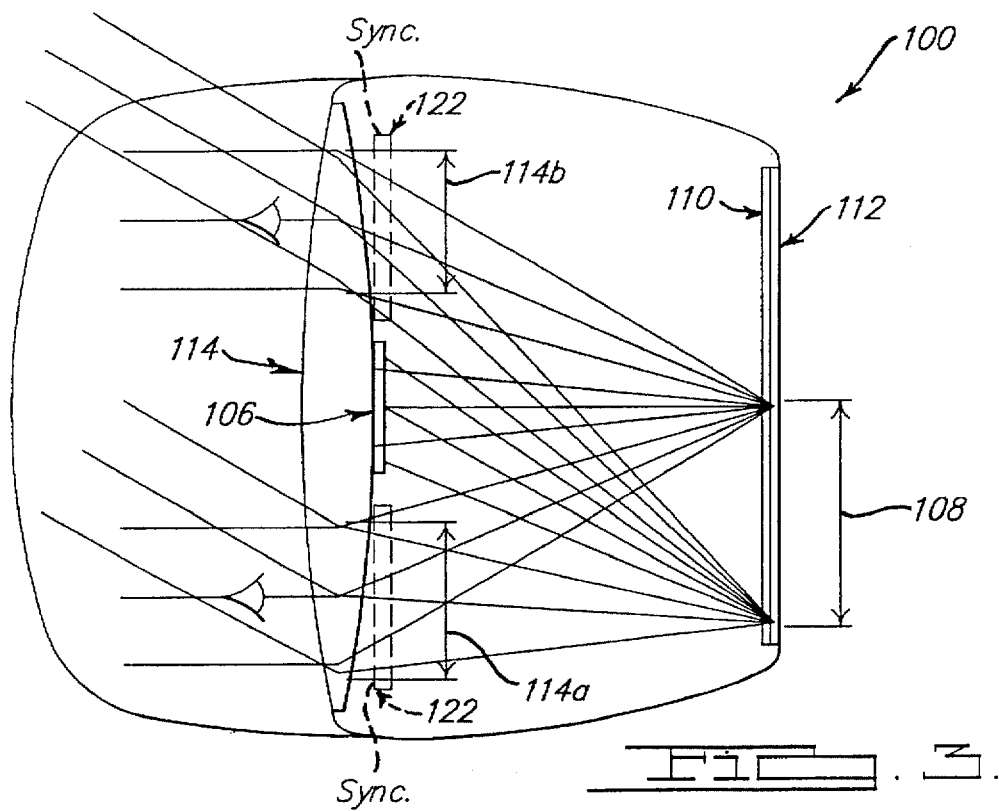
FIG. 3 is a schematic illustration of the system shown in FIG. 2 taken along the line 3—3.

Further, there are various other means for using a single object to present stereo images through a binocular viewing apparatus which may be applied to the present invention. Such means generally employ some form of coding to provide a distinguishing characteristic in the light from the object intended for the left eye virtual image which is different from that intended for the right eye virtual image. Such means are usually applied as color, intensity, or polarization variations between the two images encoded by the single object which are later separated or decoded by filtering at the eye (represented in FIG. 1 as optional filter element 120), and may further include presenting left and right images as sequential objects and mechanically or electronically shuttering the left and right eye lens areas in synchronization (represented in FIGS. 2 and 3 as optional shutter element 122).

The optical system design in accordance with the present invention should be optimized as a whole and therefore may result in certain deviations from the above embodiments. In particular, to achieve an even higher magnification or greater field of view, specific applications of the present invention may require the intermediate image to form after the beam splitting field lens, resulting in two intermediate images. In any case, the design may include optical elements such as aspheric and off-axis optics and other elements and configurations as may be known to or derived by one skilled in the art.

The imaging system of the present invention differs from conventional binocular imaging systems employing a single entrance pupil in that the system magnification is produced primarily by the single objective lens. Further, the present invention advantageously utilizes a combined beam splitter and field lens, instead of separate components. These differences result in a number of benefits over such conventional systems. First a wide field of view can be obtained with a simple eye lens or lens pair instead of a set of expensive compound lenses. Second, the expensive beam splitting cube common to conventional systems is eliminated. Third the number of fold mirrors is minimized. Fourth, the beam splitting means can be combined with another element of the optical system for reduced cost.

Furthermore, an additional benefit of the present invention results because the field lens may be used to provide magnification of the object lens pupil to adjust the size of the system exit pupil. The invention therefore provides a very comfortable exit pupil for the user without requiring significant position adjustment of the eye lens.

The present invention therefore advantageously provides a binocular optical system design which is less expensive and easier to produce than conventional designs. It is understood that modifications to the invention might occur to one having ordinary skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A binocular imaging system comprising:

means for forming an intermediate image of an object;

a field lens positioned proximate the intermediate image for concentrating the intermediate image;

a beam splitting means positioned proximate the intermediate image for imparting a positive angular deviation to a portion of the intermediate image and a negative angular deviation to the remaining portion of the intermediate image; and means for re-imaging the positive angular deviation and negative angular deviation in the intermediate image to form respective left and right eye virtual images.

2. The system of claim 1 wherein said beam splitting means comprises a striped prism structure.

3. The system of claim 1 wherein said beam splitting means comprises a holographic surface.

4. The system of claim 1 wherein said beam splitting means comprises a diffractive structure.

5. The system of claim 1 wherein said field lens comprises a Fresnel structure.

6. The system of claim 1 wherein said field lens comprises a holographic surface.

7. The system of claim 1 wherein said field lens comprises a diffractive structure.

8. The system of claim 1 wherein said field lens comprises a reflective surface.

9. The system of claim 1 wherein said beam splitting means comprises a reflective surface.

10. The system of claim 1 wherein said field lens and said beam splitting means comprise a single, integrated optical element.

11. The system of claim 10 wherein said single, integrated optical element is formed by compression molding a Fresnel lens structure into one side of a single substrate and a striped beam splitter structure into the other side of said substrate.

12. The system of claim 1 wherein said re-imaging means further comprises a means for expanding the point spread function of said system to remove artificial image structures in said virtual images.

13. The system of claim 1 wherein said object comprises stereo encoded images, and said re-imaging means further comprises a means for decoding said stereo images, wherein said re-imaging means forms respective right and left eye virtual stereo images.

14. The system of claim 1 wherein said intermediate image forming means comprises a means for generating a sequence of stereo image pairs and said re-imaging means further comprises a shuttering means synchronized with the sequence to produce respective right and left eye virtual stereo images.

15. The system of claim 1 further comprising a means for mounting the system to a viewer's head.

16. The system of claim 1 wherein said means for forming an intermediate image is positioned proximate to said re-imaging means.

17. The system of claim 1 wherein said intermediate image forming means inherently produces aberrations in the intermediate image, said field lens and said beam splitting means forming a convergent reflective surface for reversing at least some of the aberrations in the intermediate image, and said re-imaging means being arranged to produce similar aberrations as said intermediate image forming means to substantially cancel the reversed aberrations in said respective left and right eye virtual images.

* * * * *